R. C. HULL & J. L. WOODBRIDGE.
CAR AXLE LIGHTING.
APPLICATION FILED JULY 13, 1909.

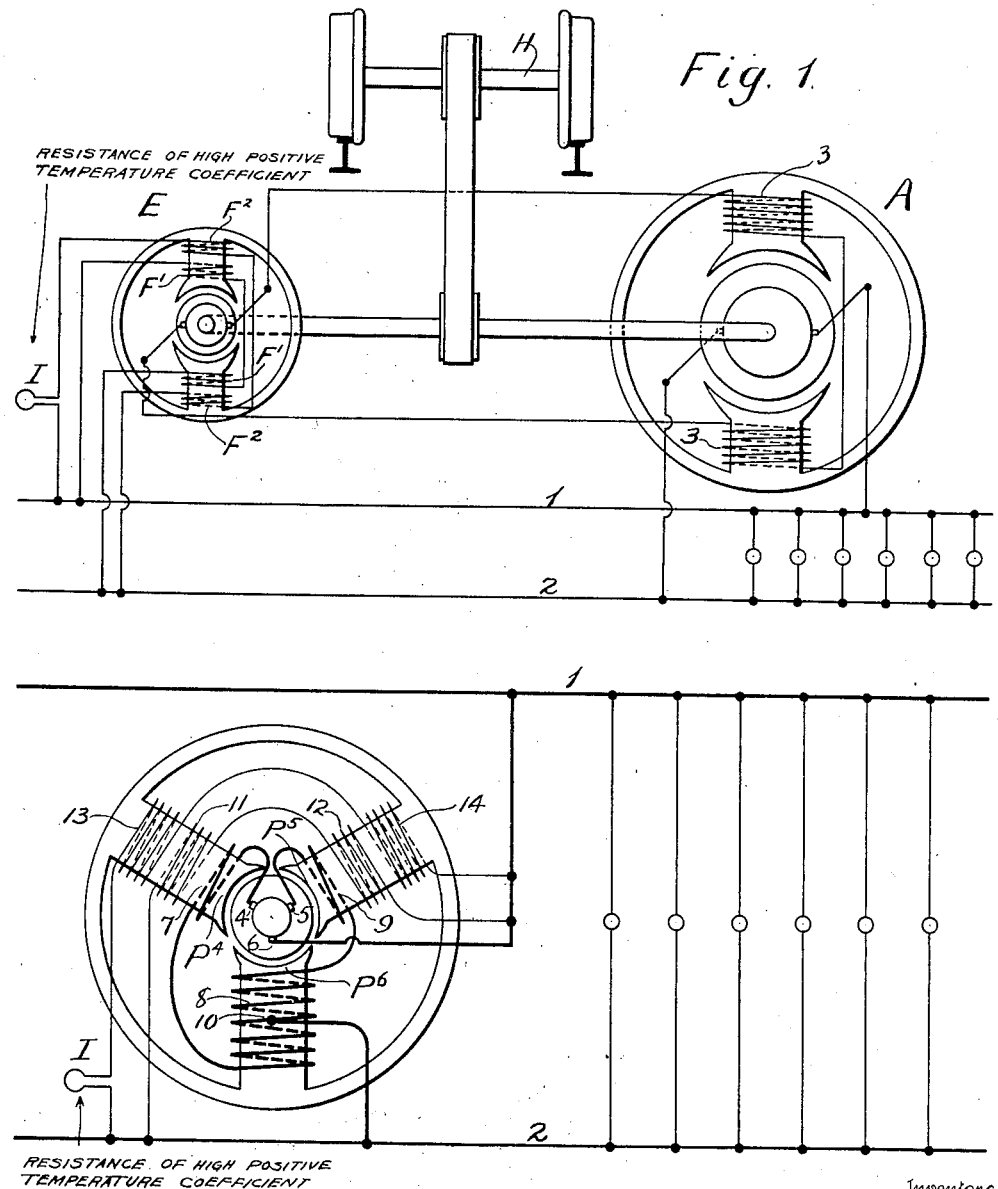

1,161,681.

Patented Nov. 23, 1915.
2 SHEETS—SHEET 2.

UNITED STATES PATENT OFFICE.

ROBERT C. HULL AND JOSEPH L. WOODBRIDGE, OF PHILADELPHIA, PENNSYLVANIA, ASSIGNORS TO THE ELECTRIC STORAGE BATTERY COMPANY, OF PHILADELPHIA, PENNSYLVANIA, A CORPORATION OF NEW JERSEY.

CAR-AXLE LIGHTING.

1,161,681. Specification of Letters Patent. Patented Nov. 23, 1915.

Application filed July 13, 1909. Serial No. 507,316.

*To all whom it may concern:*

Be it known that we, ROBERT C. HULL and JOSEPH L. WOODBRIDGE, both citizens of the United States, and residents of Philadelphia, in the county of Philadelphia and State of Pennnsylvania, have jointly invented certain new and useful Improvements in Car-Axle Lighting, of which the following is a specification.

This invention relates to systems of electrical distribution in which a generator driven at variable speed, as for example by a car axle or a windmill, is employed to furnish electric current to constant potential translating devices.

The object of the invention is to provide simple means for maintaining constant potential at the generator terminals, notwithstanding the variations in its speed.

Broadly, the invention includes two opposing exciting circuits, one of which, the predominating one, is designed to give a practically constant excitation and to produce in the generator a potential of the desired polarity but of excessive amount, the other circuit being excited from the generator terminals and acting to oppose the first.

These and other novel features of the invention will be more clearly understood by reference to the following description taken in connection with the accompanying drawings in which—

Figure 3:
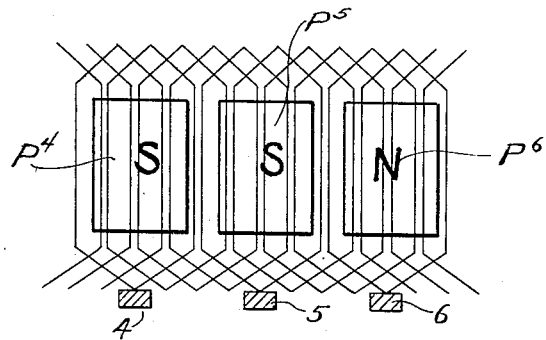
Figure 4:
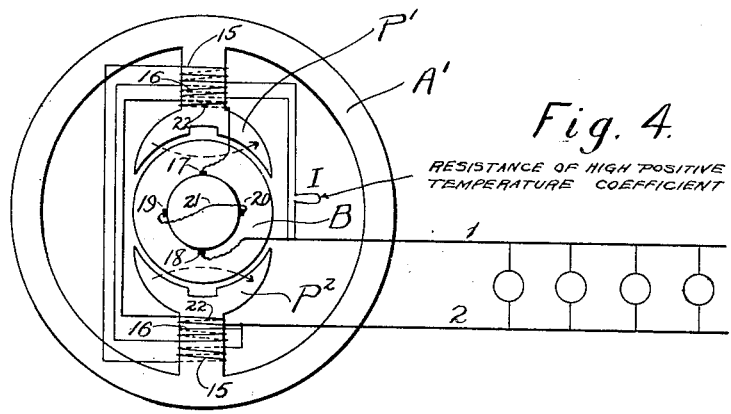

Figure 1 illustrates one embodiment of the invention. Fig. 2, shows a modification in which a three pole generator is employed. Fig. 3, is a diagram of the armature winding of the generator shown in Fig. 2, and Fig. 4, illustrates another modification of the invention.

In Fig. 1, A is a generator driven at variable speed from any suitable source, as by belt from the car axle H, and connected to the consumption circuit 1, 2. On the shaft of the machine A is the armature of a small exciter E which supplies current to the field winding 3 of the machine A. The exciter E is provided with two field windings $F^1$ and $F^2$. Both of these are connected across the circuit 1, 2. The winding $F^2$ is wound in the direction to produce a polarity in E to give the desired polarity to the machine A. A hot iron wire resistance I is shown in series with this field winding. This resistance has a high temperature coefficient and operates in the well known manner to maintain a constant current flow in $F^2$ regardless of variations of potential within certain limits across 1, 2. The field winding $F^2$ alone would produce many times the excitation required for the exciter E even at the lowest speed limit at which the apparatus is designed to operate. The field winding $F^1$ is wound to oppose $F^2$ and, at a certain potential across 1, 2, to neutralize it completely. It is obvious, therefore, that this limiting potential can never be attained, since there would then be zero excitation in the winding 3. At any desired small reduction of potential below this limit, the field winding $F^2$ may be designed to predominate over $F^1$ by an amount sufficient to produce the necessary electro-motive-force in E for the excitation of A at minimum speed. Between this minimum speed and any greater speed, the potential across 1, 2, will increase and approach but never reach the maximum limit at which $F^1$ and $F^2$ neutralize each other. These limits may be made sufficiently close to give substantially constant potential across 1, 2.

In Fig. 2, is shown a three pole generator, designed as described in Patent No. 895,824, issued to J. Lester Woodbridge, August 11th, 1908, but provided with special field windings.

The armature winding is shown diagrammatically in Fig. 3. The machine is provided with three internally projecting poles, $P^4$, $P^5$, $P^6$, and three brushes 4, 5, 6, bearing upon the commutator at points spaced 120° apart. Assume pole $P^6$ to be of north polarity, while poles $P^4$ and $P^5$ are of south polarity. As shown in Fig. 3, the armature winding is so designed that the potential between brushes 4 and 6 is proportional to the sum of the magnetic flux in poles $P^4$ and $P^6$, while the potential between brushes 5 and 6 is proportional to the sum of the flux in poles $P^5$ and $P^6$. The potential between brushes 4 and 5 is proportional to the difference of flux in poles $P^4$ and $P^5$. With this machine no exciter is used, but the main field winding, 7, 8, 9, is connected across brushes 4, and 5, and is of comparatively low resistance so that a small difference of potential between these brushes will furnish excitation for this field. The middle point 10 of this field winding constitutes one of the main terminals of the machine, brush 6 constituting the other. The current in winding 8 will produce a magnetic flux in pole $P^6$ which, in the absence of any other field excitation, will pass through the armature and divide equally between poles $P^4$ and $P^5$, and since the difference of potential between brushes 4 and 5 is proportional to the difference between the total flux in $P^4$ and that in $P^5$, there will be no difference of potential between brushes 4 and 5 under these conditions. The difference of potential between brushes 4 and 5 is produced by windings 11, 12, and 13, 14. Winding 13, 14, is connected across the main terminals of the machine in the direction to produce a difference of potential across 4, 5, to excite winding 7, 8, 9, in the proper direction to produce the desired polarity across the main terminals of the machine. This result is due to the fact that winding 13 on pole $P^4$ is wound and connected in the direction to increase the flux produced in this pole by winding 8, while winding 14 on $P^5$ is wound and connected in the direction to oppose and reduce the flux produced in this pole by winding 8. In other words, the effect of winding 13, 14, is to divert a part of the flux produced by winding 8 from pole $P^5$ to pole $P^4$, and these two fluxes being then unequal, a difference of potential is produced between brushes 4 and 5 due to this difference. An iron wire resistance I is connected in series with this winding to maintain constant excitation as in Fig. 1, but winding 13, 14, alone is sufficient to produce several times the excitation required. Winding 11, 12, is connected directly across the main terminals of the machine and opposes winding 13, 14. At some maximum limit of potential across the main terminals these two windings would exactly neutralize each other, producing zero excitation. This maximum limit can therefore never be realized, since there would then be no difference of flux between poles $P^4$ and $P^5$, and no difference of potential across brushes 4 and 5, and therefore no exciting current in winding 8. At the minimum speed at which the machine is to be operated, the potential across the main terminals is below the maximum limit by a small amount, permitting winding 13, 14, to predominate and produce a sufficient difference of potential across brushes 4, 5, to give the necessary current in the main winding 7, 8, 9, for excitation at that speed. For all higher speeds, the excitation in 7, 8, 9, will be reduced, the potential across the main terminals rising so as to reduce the excess of winding 13, 14, over winding 11, 12. Thus as shown in connection with Fig. 1, between certain speed limits, the variation in potential across the main terminals of the machine illustrated in Fig. 2 may be reduced to a negligible amount. The current delivered to the circuit 1, 2, will have no effect in the winding 8, since this current divides and passes through the two halves of the winding in opposite directions; the effect of this current in windings 7 and 9 would be to shift the flux from one pole to the other; but the armature reaction due to the same current will tend to shift the flux between the same poles in the opposite direction and the windings 7 and 9 may be so designed as to neutralize this armature re-action.

In Fig. 4, is shown a machine of somewhat different construction. A field frame $A^1$ is provided with two internally projecting pole pieces $P_1$ and $P_2$. The armature B is provided with the usual bi-polar winding and commutator, and two pair of brushes are shown whereof one pair, 17, 18, are the principal brushes and are connected to the consumption circuit 1, 2, while the other pair 19, 20, are the auxiliary brushes, and are interconnected by a conductor of low resistance 21. Two shunt field windings are shown, 15, and 16, connected across the circuit 1, 2. In series with winding 15, is an iron wire resistance I, which serves to maintain a constant current in this winding. The magnetic flux produced by this winding will develop an electro-motive-force across the auxiliary brushes 19, 20, and they will produce a flow of current through the conductor 21. This current by reason of the high armature reaction will produce a second flux in the direction shown by the arrows, and this latter flux will produce an electro-motive-force of the desired polarity across brushes 17, 18. The field winding 15 alone is sufficient to produce many times the flux necessary to give the desired potential across brushes 17, 18, but the second field winding 16, connected directly across the circuit 1, 2, opposes winding 15 and at a certain limiting potential across 1, 2, will entirely neutralize it. At some slightly lower potential winding 15 will predominate sufficiently to produce that potential at the minimum operating speed. At all higher speeds the potential will be somewhat higher increasing the effect of winding 16 and thus reducing the resultant flux to nearly compensate for the increase in speed. A series winding 22 is shown in the circuit of the principal brushes 17, 18, designed to compensate for the armature reaction due to current from these brushes.

It will be noted that in all three cases illustrated there are two opposing means for field excitation which are combined to produce a resultant field flux, and that this flux is one of the factors which, in conjunction with the varying speed of rotation determines the potential on the consumption circuit, and that of the two original exciting means, the one that predominates is substantially independent of, or at least varies less than proportionally to the potential on the consumption circuit, while the opposing means varies directly as that potential, whereby any increase in that potential tends to reduce the flux which determines that potential.

It will be obvious that many modifications may be made in the details without departing from the spirit of the invention. For example, we have shown an iron wire resistance in the predominating field circuit to hold its excitation constant, but any other of the well known means for maintaining constant or practically constant excitation in this circuit may be substituted, the essential requirements being that the excitation produced by this predominating field circuit shall vary less with changes of potential than that of the opposing field.

What we claim as new and desire to secure by Letters Patent is:

1. In combination, an electric circuit, an armature, a variable speed source of power for driving said armature, two unequal opposed exciting means for developing a resultant flux component in the armature whereof the greater exciting means is substantially constant and the lesser varies in response to changes of potential on the circuit, means for producing in the armature a second magnetic flux component responsive to the first and adapted to develop an electro-motive-force in the armature, suitable terminals located at points of potential difference due to the second flux component, and connections from said terminals to the circuit.

2. In combination, an electric circuit, an armature, a variable speed source of power for driving said armature, a field winding connected across the circuit and adapted to develop a field flux component in the armature, a resistance of high temperature coefficient in series with said field winding, a second field winding connected directly across the circuit and adapted to partially neutralize the effect of the first, armature terminals located at points of potential difference that would be produced by this resultant flux component alone, a third field winding connected to said terminals and adapted to develop a second flux component, and means for connecting the electric circuit to the armature at points of potential difference that would be produced by the second flux component alone.

3. In combination, an electric circuit, a field frame provided with three poles, an armature provided with a commutator and three brushes, and a winding whereof the coils in circuit between any pair of brushes are located in the magnetic field of the two corresponding poles, a field winding embracing each of two of the poles, connected across the circuit and adapted to develop a difference of potential between two of the brushes, a second winding embracing each of the same two poles also connected across the circuit but opposed to the first winding, means for reducing the proportionate effect on the first winding of variations of potential across the circuit, a third field winding connected across the said two brushes and adapted to produce a flux passing through the third pole and divided between the other two whereby an electro-motive-force is developed between the third brush and the other two brushes, connections from the third brush to one side of the circuit and from the other two brushes to the other side of the circuit.

In testimony whereof we have hereunto signed our names.

ROBERT C. HULL.
JOSEPH L. WOODBRIDGE.

Witnesses:
W. W. McMahon,
W. M. Ely.